Nov. 16, 1926.  
E. M. BENHAM  
1,607,385  
TIME CONTROLLER FOR ELECTRIC CIRCUITS  
Filed April 26, 1922  2 Sheets-Sheet 1
Fig.1,
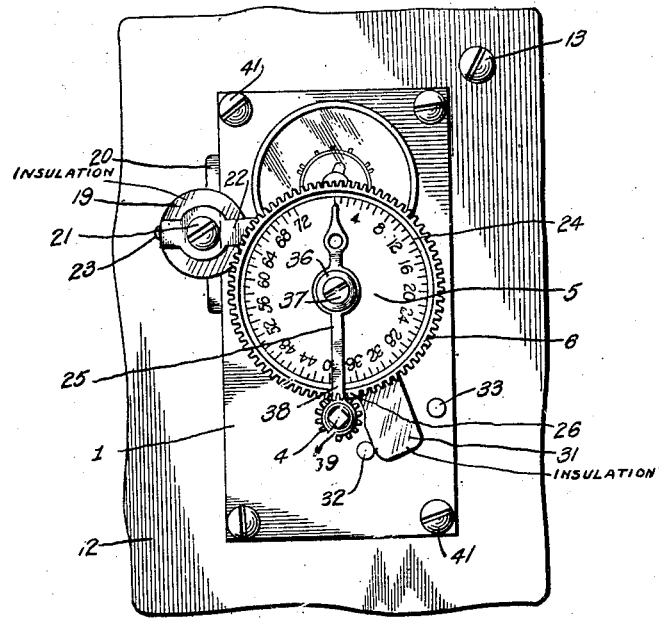
Fig.3,
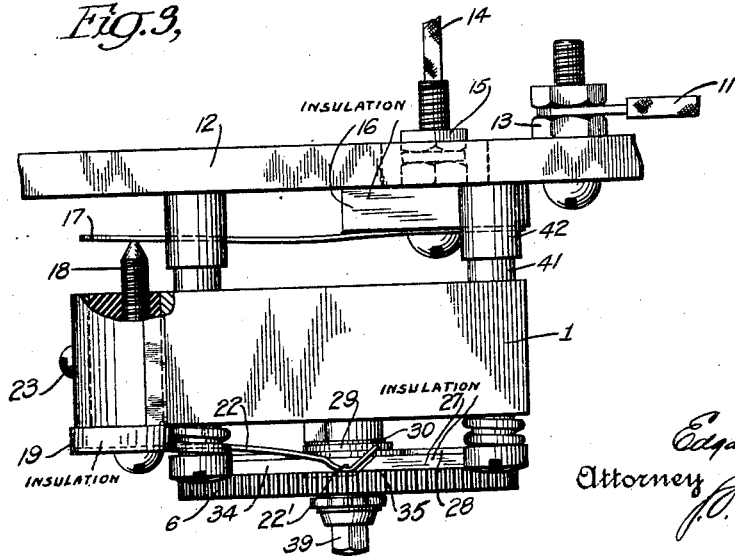
Inventor  
Edgar M. Benham  
Attorney Nov. 16, 1926.  
E. M. BENHAM  
1,607,385  
TIME CONTROLLER FOR ELECTRIC CIRCUITS  
Filed April 26, 1922  2 Sheets-Sheet 2
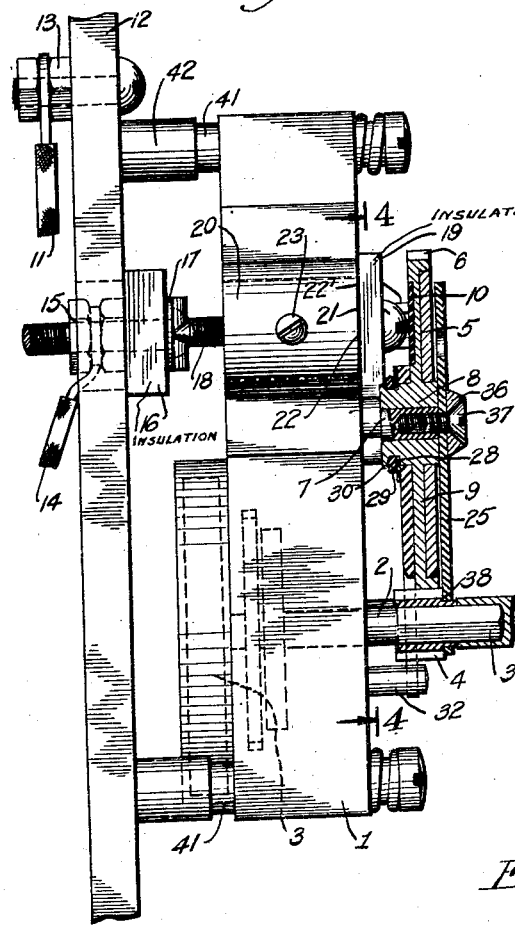
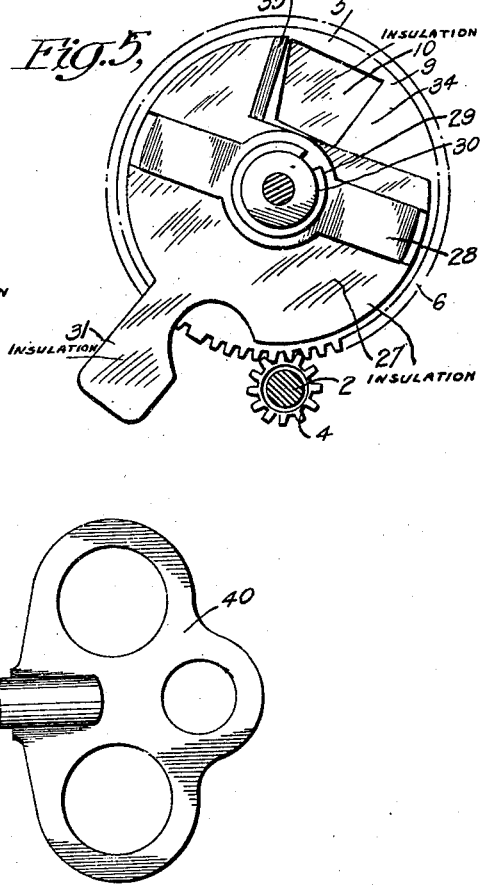
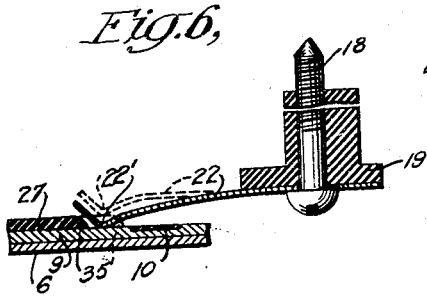
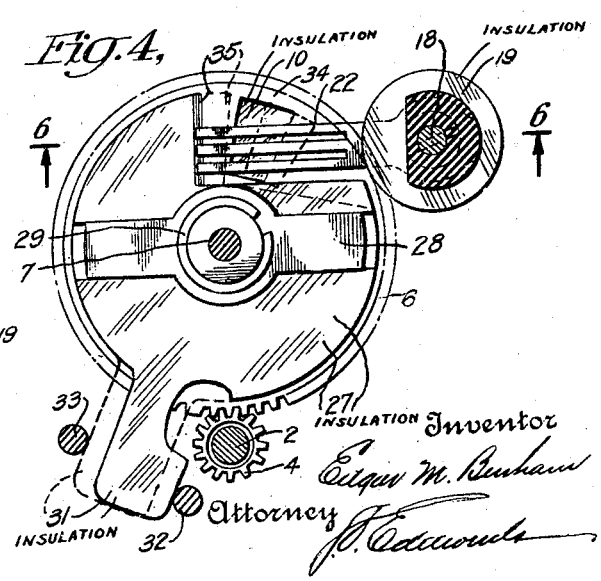
Inventor  
Edgar M. Benham  
Attorney Patented Nov. 16, 1926.

1,607,385

UNITED STATES PATENT OFFICE.

EDGAR M. BENHAM, OF NORWOOD, OHIO, ASSIGNOR TO THE MOSLER LOCK COMPANY, OF COVINGTON, KENTUCKY, A CORPORATION OF OHIO.

TIME CONTROLLER FOR ELECTRIC CIRCUITS.

Application filed April 26, 1922. Serial No. 556,710.

This invention relates to a time controller for electric circuits and more particularly to a time controller for electric time clocks or burglar alarm systems.

One of the aims of my invention is to provide a time controller for electric circuits whereby the controlled circuit is maintained automatically in positive open or closed condition for periods of time, which may be varied and may be predetermined. Another object of my invention is to provide a device of this character which may be adjusted or set to automatically change the circuit condition at one or more subsequent times, which time or times may be varied and may be predetermined. Another object of my invention is to provide a time controller having auxiliary means adapted to be moved automatically into operative position when the device is being set, and normally operating for a brief predetermined period thereafter, to maintain the circuit in predetermined condition for said brief period, and thereafter to become and to remain inoperative until the controller is again set; said auxiliary means, however, being manually movable into inoperative or into operative condition at any time. Another object of my invention is to provide a spring driven time controller of this character so constructed that the operation of setting the device for automatic operation simultaneously tensions the driving spring, thus insuring the presence of sufficient power to drive the controller for the required period of time. A further object of my invention is to provide motor-driven time controlling mechanism of this character, adapted at a predetermined time, and if desired, after intermediate operation, to place the circuit in permanent opened or closed condition; and to provide means whereby at this time the motor will be stopped. A further object of my invention is to provide a simple and efficient time controller which is especially well suited to control circuits of electric time locks or burglar alarm systems which are associated with safes or bank vaults or other similar structures. A further object of my invention is to provide a time controlling device of the above character which is self-contained, and one which may readily and easily be mounted upon or removed from a safe or vault door or other part of such structure. Other objects will be in part obvious and in part pointed out hereinafter.

In accordance with my invention I provide a resilient stationary contact member and a movable rigid contact member, respectively, connected with opposite sides of the circuit to be controlled. When these contact members are in certain relative positions they touch and the circuit is closed, and when these members are in other relative positions they are separated and the circuit is open. The movable contact comprises a metallic surface on a revolvable disc against which the stationary contact member presses to close the circuit, except when an insulation bearing portion of this surface of the disc is contacted by the stationary contact, and at this time the circuit is open. I provide means, preferably clockwork, for revolving the disc contact over the stationary contact at a constant rate, and suitably score or mark the disc so that the relative positions of the two contacts are ascertainable. I provide means for making such relative adjustment, and by following the scoring on the disc may predetermine the time at which the movement of the disc will change the condition of the circuit and the periods during which the circuit will be open and closed. I also provide auxiliary means, preferably set automatically when the controller is adjusted, whereby the disc and brush are separated for a brief period immediately after such adjustment is made; and I also provide means for stopping further operation of the driving means and further relative movement between said contacts whenever the contacts have assumed a certain relative position. The controller is designed to be readily and easily mountable upon a wall or door and be readily removable therefrom, practically integrally for adjustment or replacement.

In order that a clearer understanding of my invention may be had attention is hereby directed to the accompanying drawings forming a part of this application and illustrating certain possible embodiments of my invention. In the drawings Fig. 1 is a front elevation of a time controlling mechanism embodying my invention; Fig. 2 is a view of the device in side elevation, certain parts being shown in section along the line 2—2 of Fig. 1; Fig. 3 is a top elevation of the device; Fig. 4 is an enlarged sectional view of certain parts of the construction and is taken on the line 4—4 of Fig. 2, showing in dotted lines the position assumed by the auxiliary means upon the setting of the controller, and showing in full lines the positions subsequently assumed by these parts after the device has been operating for a time; Fig. 5 is a view similar to that shown in Fig. 4, but showing a possible modification of the invention and Fig. 6 is a sectional view taken on the line 6—6 of Fig. 4.

Similar reference characters refer to similar parts throughout the several views of the drawings.

Referring to the drawings, my time controller is driven by means of a main driving spring 3 rotating a driving shaft 2, suitable clockwork being provided and connected with said shaft to regulate and to maintain constant the speed at which shaft 2 is driven by this spring. The shaft 2 is preferably carried by a suitable casing 1 which also houses the main spring 3 and the clockwork. The shaft 2 extends outwardly from the casing 1, and there I key or otherwise secure a small gear 4 which is constantly in mesh with the peripheral teeth 6 of a disc 5 which is pivotally mounted on a metal stud 7 carried by the casing 1. Disc 5 comprises the movable contact member of the controller and is provided with a metal hub 8 and a metal under surface 9 so as to be in permanent electric connection with one side of the circuit to be controlled, the circuit comprising a conductor 11 attached by binding post 13 to the wall 12 upon which the casing is mounted in electrical contact therewith. The under surface of disc 5, however, carries a piece of insulating material 10, which is preferably countersunk in disc 5, and glued in place.

The other side of the electric circuit to be controlled comprises conductor 14 engaged by binding post 15, which is carried in a block of insulating material 16 supported in the wall 12, the binding post 15 also engaging and holding a resilient strip of metal 17 insulated from the wall 12 and in position to be engaged by a metallic screw or pin 18 adjustably mounted in a block of insulation 19 carried in a bracket 20 which is attached to or formed on a side of the casing 1. The screw 18 may be locked in adjusted position by means of a set screw 23 which extends through a threaded perforation in the outer wall of the bracket 20 and is adapted to bite against the shank of the screw 18, whereby positive electrical contact between screw 18 and strip 17 may be secured.

The stationary contact member of my controller comprises a resilient strip of metal or brush 22 which is clamped between the head 21 of screw 18 and the top of insulating block 19, whereby this stationary contact brush is held in place with its contact portion on hump 22' permanently pressing against the under surface of the disc 5. The arrangement is such that when the contact piece 22 engages a metallic portion of the under surface of disc 5 an electrical connection is established between the conductors 11 and 14 and, consequently the circuit to be controlled is closed, and, when the brush 22 contacts the insulating portion 10 carried on the under surface of disc 5 no electrical connection between the conductors 11 and 14 exists, and, consequently, the circuit is open.

The upper surface of the disc 5 is marked or scored as at 24, the distance between adjacent markings preferably being the distance the disc rotates in one hour, and certain of the marks are numbered and in noted relation to the under surface 9 of the disc. Preferably a zero mark is placed in such position on the dial that when this mark aligns with a stationary pointer 25, the contact portion 22' of brush 22 will have just passed from the metallic portion to the insulating portion 10 of the under surface of disc 5, and the circuit correspondingly changed from closed to open condition.

I preferably provide means for automatically stopping the clock mechanism and further movement of disc 5 when it arrives at a certain position relative to the brush 22. This means may comprise a widened tooth or lug 26 provided at the proper point on the periphery of the disc 5, and adapted to lock against the pinion 4 and prevent further rotation of the shaft 2. This also prevents further unwinding of the spring 3. In one embodiment the stopping lug 26 is positioned to stop the controller when brush 22 rests on insulation portion 10 and thus permanently places the circuit in open condition.

I preferably provide means whereby the adjusting of the controller for operating movement will also automatically set auxiliary means whereby the under surface of the disc 5 and the brush 22 will be held separated for a certain brief period of time thereafter. This means is designed to give the person who sets and starts the mechanism a certain amount of time, such as twenty or thirty minutes, to close the safe or leave the building before the circuit of the electric time clock or burglar alarm system becomes set by the controller.

One suitable arrangement for establishing and maintaining this period of grace may consist of a disc 27 of insulating material rotatably mounted on the hub 8 of the disc 5 and held in frictional engagement with its under surface by means of a resilient metal strip 28 pressed against the under surface of the disc 27 by means of a tension ring 29 which is seated in a groove 30 provided therefor in the hub 8. Disc 27 has a finger portion 31 extending beyond the periphery of the disc 5 and movable between two permanent stop members or pins 32 and 33 which are mounted on the top of the casing 1. Thus, disc 27 rotates with disc 5, but only to the limited extent permitted by the stops 32 and 33. A portion of disc 27 is cut away as at 34 adjacent brush 22 and the stops 32 and 33 are so disposed that when finger 31 has been brought against pin 32, as by the rotation of disc 5 in clockwise or operative direction, disc 27 does not interfere with the engagement between the under surface of disc 5 and the brush 22, but when finger 31 of disc 27 has been brought against the stop 33, as by the rotating of disc 5 in the opposite or setting direction, an edge 35 of the cut-away portion of disc 27 will be interposed between the under surface of disc 5 and the resilient brush 22 to hold them separated until removed by clockwise movement of disc 5. The removal of disc 27 from between brush 22 and disc 5 may be arranged to take place after disc 5 has rotated for any desired length of time and usually after twenty or thirty minutes. Disc 27 may be moved into either position at any time by moving finger 31 in one direction or the other.

Pointer 25 may be mounted conveniently on stud 7, being held thereon by means of a washer 36 and a screw 37 which engages in a threaded recess in stud 7 and which also serves to hold disc 5 in place. Tail portion 38 of pointer 25 loosely encircles shaft 2 whereby the pointer is held against rotation with disc 5 or otherwise.

The outer end of shaft 2 is squared as at 39 so that it may be engaged by a suitable key 40 and turned in clockwise direction to wind up spring 3. It will be noted that, on account of the permanent meshing of gear 4 and disc 5, when the shaft 2 is turned in this direction the disc 5 rotates in counterclockwise direction, which during the driving of the controller by the spring 3, the disc 5 rotates in clockwise direction.

My controller may be adapted to circuits normally closed or to those normally open, and it may be arranged to cause one or more changes in the circuit condition after a single setting, and also may be arranged to place the circuit permanently in either closed or open condition at a desired time. For all these embodiments, as well as others, the casing 1 and the parts carried thereby are preferably so arranged that they may readily and securely be mounted on the inside of a wall or door of the safe or other structure to be protected as by means of screws 41, extending through suitable holes in the casing 1, as at the corners thereof, and adapted to engage threaded socket pieces or lugs 42 which are mounted on the wall or door. Thus, when it is desired to dismount the controller for adjustment or for replacement it is only necessary to loosen screws 41 and the casing and all the mechanism carried thereby comes away together. In mounting the device on the wall or door the conductors of the circuit to be controlled are connected respectively to the binding posts 13 and 15 and the screw 18 is adjusted and locked in such position that it establishes good electrical contact with strip 17.

In one embodiment when the stopping lug 26 engages gear 4 to prevent further movement of disc 5 and hold the circuit in open condition until an adjustment is made the brush 22 rests on the insulating portion 10 of disc 5 the zero mark of the dial is slightly past the pointer 25. Now, to adjust or set the controller to keep the circuit closed for the desired length of time, for example, for sixteen hours, and then to open the circuit, disc 5 is rotated counter clockwise by means of key 40, acting through shaft 2 and gear 4, until the corresponding figure on the dial, figure 16 in this instance, is in alignment with the pointer 25. The controller is now set and the clockwork begins to operate, but, as before described, contacts 22 and 5 will be held separated by member 27 for a period of twenty or thirty minutes to allow the person who sets the controller time to leave the vault or building. After the period of grace has elapsed brush 22 will contact with the metallic undersurface of disc 5 as it passes over the brush, until insulating portion 10 is again carried against brush 22, which occurs after the sixteenth hour, or other period of time for which the adjustment was made, has elapsed. It will be noted that setting the device by means of key 40 also causes the driving spring 3 to be tensioned, thus insuring sufficient driving power to drive the controller for the required time. Preferably the spring 3 is tensioned somewhat when the zero mark registers with the pointer 25, and if it should require further tensioning this may be readily accomplished by lifting gear 4 from shaft 2 and winding up the spring by means of the key.

When a time controller of this character is associated in circuit it may readily be set to keep the circuit closed for any desired length of time, up to the capacity of the controller, and then to automatically place the circuit permanently in open condition. However, if the employe leaves without setting the controller the circuit is left open and in unprotecting position. To meet this contingency I may modify the construction of the controller so that if the employe leaves the vault without setting the controller, it, nevertheless, will operate to automatically close the circuit into protecting condition. This modification consists of placing the stopping tooth or lug in such a locality on the periphery of disc 5 that the rotation of disc 5 will not cease until the insulating portion 10 of the disc has passed completely over the brush 22 and the brush again contacts with the metal undersurface of disc 5 to close the circuit. In addition, I widen the insulation 10, as shown in Fig. 5, so that a predetermined number of hours, such as eight, will elapse while the portion is passing in contact with brush 22, and the circuit remains open. With this modification the device is set as formerly, say at five o'clock in the afternoon, so as to protect the value until eight o'clock the next morning, that is for sixteen hours. Now, if the controller is neglected it will continue to operate all during the day, but on account of the extended piece of insulation 10 being in contact with the brush 22 the circuit remains open for the entire working day of eight hours, as desired. Now, if at the end of the day the employe neglects to set the controller when closing the vault, the controller nevertheless closes the circuit after the eight hours have elapsed and places the circuit in permanent closed condition. Of course, when the employe re-enters the vault the next morning the burglar alarm rings, but the vault has been protected in the meantime.

Obviously, if the circuit is such that protection is afforded when the circuit is open, the major portion of the under surface 9 of disc 5 should comprise insulation and the smaller portion 10 should be conducting material, and the disc 27 should also be constructed of conducting material instead of insulation. Except for the reversed conditions of the circuit controlled, the operation of the controller is the same as described above. Such modification is within the scope of my invention.

Moreover, as many other changes could be made in the above constructions, and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In a device of the character described, in combination, two contact members normally in touching contact with each other and one relatively movable with respect to the other, a separate insulating member movable with respect to both said contact members and having frictional engagement with one of said members and movable thereby into and out of separating position between said contact members, and stop means limiting movement of said insulating member.

2. In a device of the character described, in combination, a contact point, a contact disc movable relatively to said point, resilient means normally holding said contact point against said disc, a separate insulating member, means for holding said member in frictional engagement with said contact disc for movement therewith, said insulating member being movable with the contact disc into and out of separating position between said contact point and disc, and stop means limiting the extent to which the insulating member may move with said contact disc.

3. In a device of the character described, in combination, a drive shaft, clock work for driving the drive shaft, a gear rotatable with the drive shaft, a rotatable indicating disc, and teeth on said disc meshing with said gear, one of said teeth being widened whereby when said widened tooth engages said gear rotation of said disc and gear ceases.

4. In a device of the character described, in combination, a drive shaft, clock work for driving the drive shaft, a gear rotatable with the drive shaft, a rotatable indicating disc, and teeth on said disc meshing with said gear, one of said teeth being widened whereby when said widened tooth engages said gear rotation of said disc and gear ceases, said drive shaft being manually rotatable in reverse direction to rotate said disc in reverse direction and withdraw said widened tooth different distances from said gear.

5. In a device of the character described, in combination, a stud, a disc rotatable on said stud and having its under surface partially conducting material and partially insulating material in circumferential alignment, a stationary contact normally touching the under surface of said disc, a drive shaft, clock work for driving the drive shaft, a gear rotatable with the drive shaft, teeth on said disc meshing with said gear, one of said teeth being widened whereby when said widened tooth engages said gear rotation of said disc and gear ceases.

6. In a device of the character described, in combination, a stud, a disc rotatable on said stud and having its under surface partially conducting material and partially insulating material, a stationary contact normally touching the under surface of said disc, a drive shaft, clock work for driving the drive shaft, a gear rotatable with the drive shaft, teeth on said disc meshing with said gear, one of said teeth being widened whereby when said widened tooth engages said gear rotation of said disc and gear ceases, said widened tooth being so disposed on said disc with respect to said insulating portion of the under surface of the disc that when the widened tooth engages the gear the stationary contact will be touching said insulating portion.

7. In a device of the character described, in combination, a stud, a disc rotatable on said stud and having its under surface partially conducting material and partially insulating material, a stationary contact normally touching the under surface of said disc, a drive shaft, clock work for driving the drive shaft, a gear rotatable with the drive shaft, teeth on said disc meshing with said gear, one of said teeth being widened whereby when said widened tooth engages said gear rotation of said disc and gear ceases, said widened tooth being so disposed on said disc with respect to said insulating portion of the under surface of the disc that when the widened tooth engages the gear the stationary contact will be touching said insulating portion, said drive shaft being manually rotatable in reverse direction to rotate said disc in reverse direction and withdraw said widened tooth different distances from said gear, and to move said insulating portion of the disc different distances from said stationary contact.

8. In a device of the character described, in combination, a stud, a disc rotatable on said stud and having its under surface partially conducting material and partially insulating material, a stationary contact normally touching the under surface of said disc, a drive shaft, clock work for driving the drive shaft, a gear rotatable with the drive shaft, teeth on said disc meshing with said gear, a separate insulating member rotatable on said stud into and out of separating position between said disc and contact, said member frictionally engaging said disc for rotation therewith in one direction into separating position between said contact and disc and for rotation therewith in the reverse direction out of separating position between said contact and disc.

9. In a device of the character described, in combination, a stud, a disc rotatable on said stud and having its under surface partially conducting material and partially insulating material, a stationary contact normally touching the under surface of said disc, a drive shaft, clock work for driving the drive shaft, a gear rotatable with the drive shaft, teeth on said disc meshing with said gear, a separate insulating member rotatable on said stud into and out of separating position between said disc and contact, said member frictionally engaging said disc for rotation therewith in one direction into separating position between said contact and disc and for rotation therewith in the reverse direction out of separating position between said contact and disc, and stops in the path of movement of said member limiting the extent of its movement with said disc in either direction.

10. In a device of the character described, in combination, a stud, a disc rotatable on said stud and having its under surface partially conducting material and partially insulating material, a stationary contact normally touching the under surface of said disc, a drive shaft, clock work for driving the drive shaft, a gear rotatable with the drive shaft, teeth on said disc meshing with said gear, a separate insulating member rotatable on said stud into and out of separating position between said disc and contact, said member frictionally engaging said disc for rotation therewith in one direction into separating position between said contact and disc and for rotation therewith in the reverse direction out of separating position between said contact and disc, indicia on the upper face of said disc, and a stationary pointer mounted over said disc on said stud and shaft.

11. In a device of the character described, in combination, a stud, a disc rotatable on said stud, a stationary contact resiliently contacting the under surface of said disc, a separate insulating member rotatable on said stud into and out of separating position between said contact and disc, means pressing said member against said disc for rotation therewith, means for rotating said disc in one direction to move said member from between said contact and disc, and means for rotating said disc in reverse direction to move said member into separating position between said contact and disc.

12. In a device of the character described, in combination, a stud, a disc rotatable on said stud, a stationary contact resiliently contacting the under surface of said disc, a separate insulating member rotatable on said stud into and out of separating position between said contact and disc, means pressing said member against said disc for rotation therewith, means for rotating said disc in one direction to move said member from between said contact and disc, means for rotating said disc in reverse direction to move said member into separating position between said contact and disc, and stops in the path of movement of said member limiting the extent of its movement in either direction.

13. In a device of the character described, in combination, a stud, a disc rotatable on said stud, a stationary contact resiliently contacting the under surface of said disc, a separate insulating member rotatable on said stud into and out of separating position between said contact and disc, means pressing said member against said disc for rotation therewith, means for rotating said disc in one direction to move said member from between said contact and disc, and means for rotating said disc in reverse direction to move said member into separating position between said contact and disc, said member being manually movable in either direction with respect to said disc.

14. In a device of the character described, in combination, means for keeping an electric circuit closed for a predetermined length of time and for opening said circuit after said time has elapsed, said means including a rotatable disc having an under surface, a portion of which comprises conducting material and another portion of which comprises insulating material, spring driven clockwork for rotating said disc in one direction at a constant rate of speed, manually operable means for rotating said disc in the other direction to set said disc in a predetermined position, a stationary contact member normally touching said under surface, an auxiliary means, comprising a disc of insulating material frictionally engaged by said under surface so as to be movable therewith, whereby said under surface by movement in said direction moves said insulating disc between said under surface and said stationary contact to place the circuit in open condition, means to limit movement of said insulating disc in said direction whereby said insulating disc is moved a predetermined extent of reverse rotation with respect to said under surface from between said members.

15. In a device of the character described, in combination with a stationary resilient contact member connected with one side of an electric circuit, a rotatable disc in connection with the other side of said circuit and having a conducting area of under surface adapted to be contacted by said stationary contact during a predetermined extent of rotation of said disc and having a non-conducting area of under surface adapted to be contacted by said stationary contact during another predetermined extent of rotation of said disc, means comprising a spring-driven shaft having a gear meshing with teeth on said disc for driving said disc in one direction, clockwork for regulating the speed of rotation of said disc, means, comprising a key adapted to engage said shaft for moving said disc in the other direction to set the device and simultaneously to tension the driving spring for said shaft, an insulating member movable by said disc into separating position between said stationary contact and said under surface when said disc is moved in setting direction and movable by said disc from between said contact and said under surface by a predetermined extent of movement of said disc in the reverse direction, means comprising a dial on said disc and a stationary pointer cooperating therewith, for indicating the position of said disc with respect to said stationary contact, and means comprising a lug on said disc adapted to lock against said gear on the driven shaft for preventing further rotation of said shaft and disc when said disc and stationary contact have assumed a predetermined relative position.

This specification signed this 21st day of April, 1922.

EDGAR M. BENHAM.